United States Patent [19]

Lubowski et al.

[11] 4,069,355
[45] Jan. 17, 1978

[54] PROCESS OF MAKING STRUCTURED X-RAY PHOSPHOR SCREEN

[75] Inventors: Stanley J. Lubowski, Scotia; Robert K. Swank, Schenectady, both of N.Y.

[73] Assignee: General Electric Company, Schenectady, N.Y.

[21] Appl. No.: 716,089

[22] Filed: Aug. 20, 1976

Related U.S. Application Data

[62] Division of Ser. No. 571,950, April 28, 1975, Pat. No. 4,011,454.

[51] Int. Cl.² ............................................. H01J 1/62
[52] U.S. Cl. ................................... 427/70; 250/483; 250/486; 427/69; 427/248 R; 427/248 J; 427/259; 427/282; 427/264; 427/275; 427/380; 427/161
[58] Field of Search ............... 250/483, 486; 427/69, 427/70, 259, 282, 264, 380, 248 R, 248 J, 275, 299, 161

[56] References Cited

U.S. PATENT DOCUMENTS

| | | | |
|---|---|---|---|
| 3,360,450 | 12/1967 | Hays | 250/486 |
| 3,769,059 | 10/1973 | Driard | 250/483 |
| 3,783,297 | 1/1974 | Houston | 250/483 |
| 3,783,298 | 1/1974 | Houston | 250/483 |
| 3,783,299 | 1/1974 | Houston | 250/483 |
| 3,857,036 | 12/1974 | Novak | 250/486 |
| 3,868,512 | 2/1975 | Prener | 250/486 |
| 3,873,065 | 3/1975 | Wolf | 427/88 |
| 3,930,065 | 12/1975 | Baker | 427/89 |

*Primary Examiner*—Ralph S. Kendall
*Assistant Examiner*—John D. Smith
*Attorney, Agent, or Firm*—Geoffrey H. Krauss; Joseph L. Cohen; Jerome C. Squillaro

[57] ABSTRACT

A phosphor screen for converting x-rays to light includes a large number of discrete columns of the phosphor material, say doped CsI, with the spaces therebetween preferably filled with a reflective substance, which itself may be phosphor (e.g., $Gd_2O_2S$ or $La_2O_2S$). Because of the resulting inhibition of lateral spread of light within the phosphor screen, it may be made thicker than conventional screens while achieving at least as high resolution and contrast, thereby increasing brightness (and thus requiring lower x-ray "doses"). A method for making the screen includes using a patterned substrate and wide-angle vapor deposition (as in a hot-wall evaporator) so as to deposit the phosphor only on the raised portions of the substrate.

15 Claims, 5 Drawing Figures

Fig. 2
a. PATTERN SUBSTRATE
b. DEPOSIT C$_s$I ON SUBSTRATE
c. FIRE AT 450-500° C.
d. REDEPOSIT
e. REFIRE AT 450-500° C.
Fig. 3
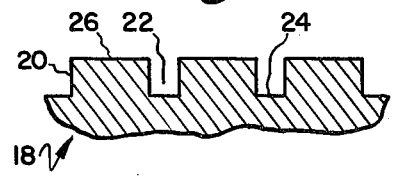
a.
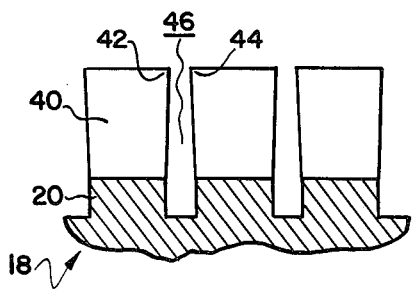
b.
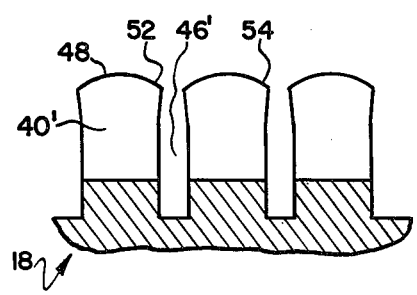
c.
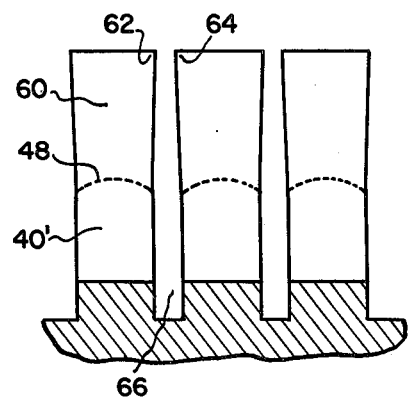
d.
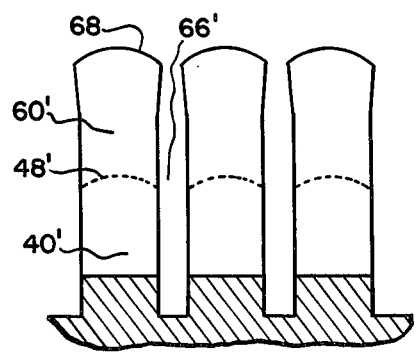
e.

Fig. 2
*f.* FIRE AT 615° C.
*g.* FILL SPACES
*h.* COAT TOP SURFACE
Fig. 3
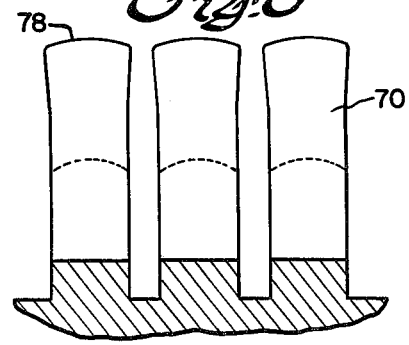
*f.*
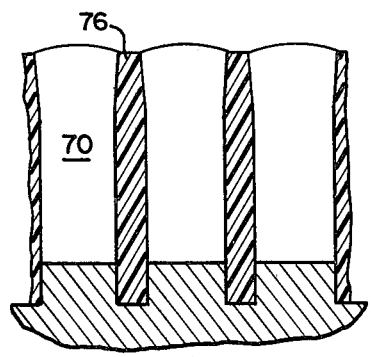
*g.*
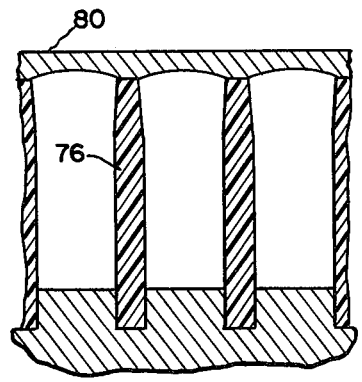
*h.*
Fig. 4
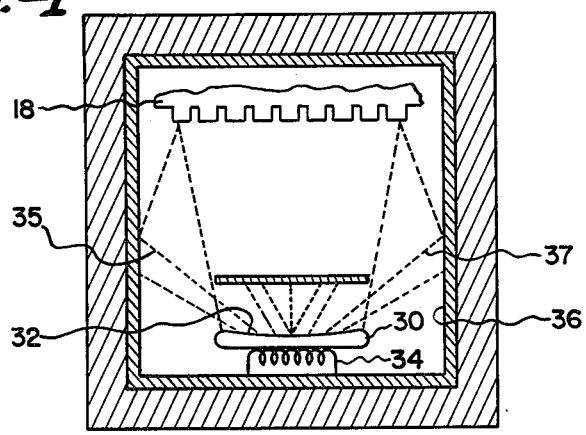

PROCESS OF MAKING STRUCTURED X-RAY PHOSPHOR SCREEN

This is a division, of application Ser. No. 571,950, filed Apr. 28, 1975, now U.S. Pat. No. 4,011,454, issued Mar. 8, 1977.

This invention relates to a method for making a phosphor screen utilized in X-ray apparatus to convert the x-rays to a visible form of light. In particular, the improved phosphor screen of the present invention is especially suitable for use at the input end of an x-ray image intensifier tube. Such x-ray intensifier tubes are typically utilized in x-ray machines for medical use, so as to reduce the amount of x-radiation that passes through the body organ being observed. Such x-ray image intensifiers typically include a face plate at the input end behind which is a phosphor layer or screen for absorbing the incident x-ray photons and emitting light photons. Immediately behind this phosphor screen is a photocathode or photoemitting layer which absorbs the light photons from the phosphor and emits photoelectrons. These photoelectrons are accelerated and focussed inside the (evacuated) x-ray image intensifying tube so as to form an "image" onto a second phosphor screen at the output or rear end of the tube. Since the original or input phosphor layer or screen will emit many light photons for each x-ray photon absorbed, and the photoelectrons from the photoemitter resulting from these photons are accelerated within the tube, a relatively bright image may be obtained at the output end of the tube.

The brightness of the final image is, in part, a function of the thickness of the original phosphor layer at the input side of th tube, in that the thicker this layer is the greater will be the absorption of the original x-rays threby. On the other hand, as this layer is made thicker and thicker, both the resolution and contrast are decreased because light photons emitted in response to absorption of a single x-ray photon will emerge from the phosphor surface at points more and more remote in the transverse direction as the thickness is increased. Such lateral spreading is caused by two factors: firstly, the phosphor emits light photons in all directions from the point at which a x-ray photon is absorbed; and secondly, even light photons which are traveling more or less perpendicularly to the surface may be scattered (at least to some extent) in the lateral direction before they reach the surface. Thus, the actual thickness of the phosphor layer or screen in the input end of such an image intensifying tube is a compromise between the desired (high) x-ray absorption as may be obtained from thick layers and the required or desired (high) resolution and contrast which increases as the thickness of the phosphor screen is reduced. Obviously, it would be desirable to increase the thickness of the phosphor screen without degrading the resolution and contrast. Generally speaking, this can be accomplished by limiting the lateral path lengths of light photons within the phosphor screen, and certain techniques for accomplishing this have already been proposed. For example, each of U.S. Pat. Nos. 3,783,297; 3,783,298 and 3,783,299 concern x-ray image intensifier input phosphor screens having means for reducing the lateral spread of light within the phosphor screen (and methods for manufacturing such devices). The present invention is directed toward the same problem of reducing the spread in the lateral direction of light photons within the phosphor screen. However, the structure of the instant invention differs from the three mentioned patents in that the material of the screen (e.g., doped cesium iodide) itself at least partly contributes to inhibiting the lateral light spreading. Similarly, the technique of making such a screen is entirely different from that of the three above-mentioned patents. Specifically, the cesium iodide is vapor deposited (as in a vacuum evaporator) onto a substrate (which preferably is contoured so as to have raised platforms on which the material will preferentially deposit) in such a manner as to form a series of columns or pillars of the phosphor material with a space surrounding each of such columns. In this manner, any light photons generated within each individual column of the phosphor will tend to be maintained therein by total internal reflection unless the photon strikes a surface at a moderately small angle of incidence (as measured from the normal to the surface). In this manner, a relatively "tall" or high column will tend to act as a "light pipe" so as to increase the proportion of light photons generated which leaves the upper surface (when the column is thought of as extending up from the substrate) and reducing the number of such photons which leave the column in the lateral direction (i.e., through any of the surfaces which are generally vertical and perpendicular to this top surface). In order to further reduce the percentage of light photons which might escape through such vertical surfaces (by striking the surface at angles less than the critical angle), preferably the space between each of the individual columns is filled with a material which acts so as to inhibit such lateral spreading. Preferably, this material is highly reflecting (rather than absorbing) so that a greater proportion of those photons which escape through the lateral walls of the columns are reflected back into the columns rather than being merely eliminated (as would be the case, for example, if the material between columns were primarily absorbing of such photons). Ideally, the material between columns is not only reflecting but is, itself, a phosphor material (i.e., will absorb x-ray photons so as to produce its own light photons). By proper formation and treatment of the deposited phosphor material, the columns can be made substantially transparent and with relatively smooth surfaces so as to increase the total amount of light photons which reach the upper surface (which is the surface adjacent to the photoemitting layer of the x-ray intensifying tube). Further, the incorporation of a highly reflective material between the individual columns substantially increases the proportion of the generally laterally traveling light photons which ultimately leave the upper surface of the very same column in which they were generated. Thus, a phosphor screen made in accordance with the present invention not only inhibits the photons from spreading in the lateral direction (which spreading would reduce both resolution and contrast), but in fact, returns most of these laterally spreading photons back into the same (quite small) area of the column in which they originated in such a manner that most of them ultimately leave the desired upper surface of this same column, thereby increasing the efficiency of the screen.

Accordingly, an object of the invention is to provide an improved phosphor screen of the type utilized in an x-ray image intensifier tube, which screen simultaneously yields relatively high x-ray absorption (because the screen may be made relatively thick, that is, the columns may be relatively tall) and high resolution and contrast of the image (because the lateral spreading of light photons is substantially inhibited).

Another object of the invention is to provide a phosphor screen of the type just mentioned in which those light photons which would otherwise spread laterally are returned to a substantial extent back to the same area in which they were generated in such a manner that a substantial percentage thereof ultimately leave the upper surface of the screen in close proximity to the position where they were originally generated by the x-ray absorption.

A further object of the invention is a method of manufacturing such improved phosphor screens in a practical and relatively inexpensive manner.

Further objects and advantages of the invention will be obvious to one skilled in the art upon reading the following detailed description of an exemplary preferred embodiment of the invention in conjunction with the accompanying drawings in which:

FIG. 1 is a somewhat schematic cross-sectional view of a conventional x-ray intensifying tube indicating how it is normally utilized;

FIG. 2, comprising FIGS. 2a–2h, is a flow diagram of the various steps utilized in making a phosphor screen according to the invention;

FIG. 3, comprising FIGS. 3a–3h, shows the phosphor screen in each of its various stages of manufacture, as it will appear upon completion of the corresponding step of FIG. 2;

FIG. 4 is an elevational cross section, somewhat of a schematic nature, of a hot wall vacuum evaporator utilized in manufacturing a phosphor screen according to the invention; and FIG. 5 is a graphical representation comparing a phosphor screen made according to the invention with two conventional solid layer phosphor screens of the same chemical material.

Detailed Description

Figure 1:
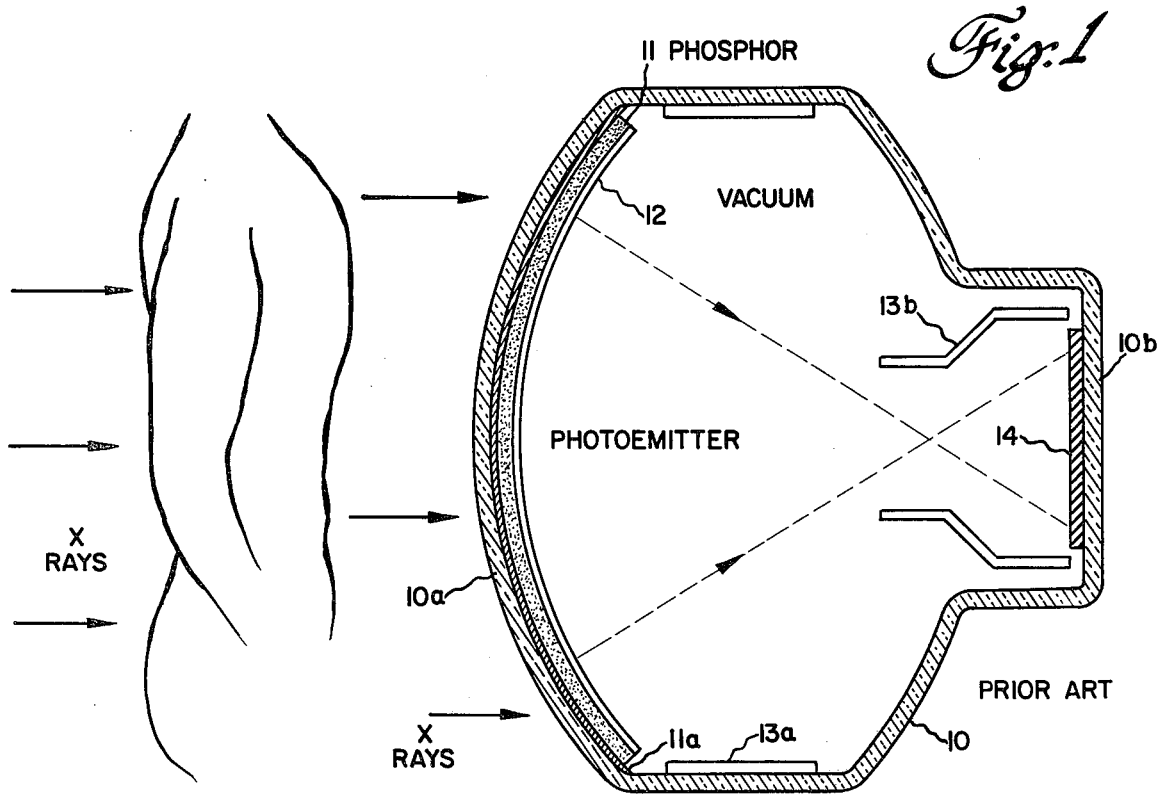

FIG. 1 shows a conventional X-ray image intensifier tube, comprising a glass envelope 10 the interior of which has been evacuated. At the input end of the envelope or tube 10, a face plate 10a carries on its interior surface a phosphor layer 11 of uniform thickness in the range of about 5 to 12 mils (i.e., about 125–300 microns). Optionally, an optically opaque but X-ray permeable layer 11a may be positioned between the face plate 10a and the phosphor screen 11 so as to suppress the entering of incident light without affecting the X-rays which travel into the tube in the manner indicated by the arrows at the left of the figure. Such a thin opaque layer 11a may be, for example, cardboard or a thin sheet of aluminum (or other relatively low atomic weight metal). On the inner surface of the phosphor layer 11 a very thin film 12 of a photoemitting material is deposited (having a thickness of approximately 100 Angstroms). Thus the X-rays absorbed by the phosphor 11 causes the emission of light photons (many such photons being emitted for each X-ray photon absorbed), which light photons in turn are converted by the photoemitting layer 12 (by absorption and reemission) into photoelectrons. Those photoelectrons which are traveling generally to the right in FIG. 1 are focussed by first electrode 13a, which may be maintained at a potential of several hundred volts and are accelerated toward a second phosphor screen 14 deposited on the inner surface of the rear or output end 10b of the glass envelope by electrode 13b which is maintained at many thousand volts potential (e.g., 25 kilovolts). The electrodes 13a and 13b are suitably shaped and are maintained at suitable potential to provide "optical" focussing of the accelerated photoelectrons on screen 14, so that a brighter version of the image on the first phosphor screen 11 is formed on output screen 14, which image may be viewed directly by the operator (e.g., physician).

It is deemed obvious that the greater percentage of the entering X-rays which are absorbed by the original input phosphor 11 (and therefore the greater the number of light photons emitted thereby), the higher will be the signal to noise ratio of the image. On the other hand as explained above, the thicker that phosphor screen 11 is made, the greater the degradation of both the resolution and the contrast of the image, since light photons which are generated within the phosphor layer and travel laterally (i.e., a large angle relative to the surface of the phosphor screen) will in part emerge at positions not corresponding to those of the X-rays that originally caused their emission. The present invention improves the resolution (and contrast) provided by a phosphor screen of a given thickness or alternatively allows the utilization of a thicker and therefore more absorbing (of X-rays) input phosphor screen without sacrificing high resolution and high contrast (or alternatively improves both such absorbtion by somewhat increased thickness and improved resolution and contrast by limiting the travel in a lateral direction of the light photons). Although the underlying phenomena of the present invention is somewhat similar to that of, for example, U.S. Pat. Nos. 3,783,298 and 3,783,299 mentioned above, both the actual structure and techniques of making the phosphor screen are substantially different. If brief, the present invention forms the phosphor screen as an array of separate small columns or pillars extending generally perpendicular to the overall surface of the screen, so that light photons generated within each individual column tends to stay therein and therefore emerge very near the point of their original emission (i.e., the locus where the original X-ray was absorbed). Further, the spaces between each of these small individual columns is preferably filled with a material which is highly reflective so that those light photons which would otherwise escape from the sides of the columns are not merely inhibited from so doing, but are in fact returned to the column and (at least in the majority of cases) ultimately leave the top of the column (i.e., to the right of FIG. 1) so as to add to the brightness without causing any adverse effects on the resolution and contrast of the screen.

An exemplary preferred manner in which a phosphor screen in accord with the invention may be manufactured is illustrated by the flow diagram of FIG. 2 in conjunction with the analogous structural depictations of the resulting products from each of these manufacturing steps in FIG. 3. The first step is to form a three-dimensional pattern on the substrate onto which the cesium iodide is later to be deposited; specifically the substrate may be an aluminum sheet which is patterned by die-pressing so as to result in the three-dimensional pattern illustrated in FIG. 3a. In a specific successful embodiment of the inventive phosphor screen, the aluminum was contoured so as to have substantially square raised portions 20, the sides of which were about 100 microns (4 mils) separated by valley portions 22, having a lateral extending portion 24 of approximately 25 microns, the surface 24 being approximately 35 microns lower than the upper surface 26 of the raised or platform portions of the substrate. Although only one series of raised and recessed portions 20, 22 are seen in the elevation view of FIG. 3, it is understood of course that there are innumerable such rows of raised and recessed portions, one behind the other, formed in the sheet with a recessed portion of course being behind each of the raised square portions 20 as one goes along the line perpendicular to the plane of the drawing. Similarly, the exemplary few illustrated such portions are obviously only a few of the many that would be made in the direction extending in the plane of the paper. Thus, viewed from the top the substrate would have the general appearance of a checkerboard, except that instead of lines between the various squares in the checkerboard there would be the recesses 22. The substrate would then be positioned in a vacuum evaporator so that cesium iodide as a vapor can be preferentially deposited on the raised portions 20 without being substantially deposited on the valley or recess portions 22. It has been found preferable to utilize what is known as a hot wall vacuum evaporator to better effect this result. Such an evaporator is schematically illustrated in FIG. 4 where a source of cesium iodide is schematically illustrated by a conventional "boat" 30 containing powdered cesium iodide at 32 and heated by any convenient means such as schematically illustrated heating coil 34. The evaporator is designated of the hot wall type in that the interior wall 36 is maintained at a temperature sufficiently high so that cesium iodide vapor traveling in lines hitting the sidewalls, such as 35, 37, will nevertheless reach the vicinity of the other end of the chamber at which the substrate 18 is positioned at fairly large incident angles (relative to the normal to the substrate surface). The direct paths from the boat to the substrate (which would cause deposition at relatively small incident angles) is preferably blocked by a baffle 38. Thus, the cesium iodide will deposit on the substrate, which is maintained at a temperature within the range of about 50°–150° C, solely at fairly high incident angles, and this has been determined to improve the desired form of growth, which is for the deposited cesium iodide to form towers or columns 40 solely on the raised portions 20 of the substrate 18 as shown in FIG. 3b. It has been found practical to deposit the cesium iodide on the substrate in such a hot wall vacuum evaporator at an usually high rate, namely, at approximately 50 micron thickness per minute. Thus, after approximately only 2½ minutes the cesium iodide will have formed towers or columns 40 which will be approximately 125 microns (5 mils) high, as shown in FIG. 3b. It should be noticed that substantially no material is deposited in the recesses, partly because of the shadowing action of the raised portions 20 of the substrate itself and partly (once deposition has started) by the analogous and even greater shadowing effect of the columns 40 themselves. It should also be noticed in FIG. 3b that as the deposition continues there is a tendency for the columns to thicken or spread especially near the top when they have reached a height of approximately 125 microns; indeed, as will be seen hereinafter, the deposition is primarily stopped at this point to avoid such spreading as indicated at 42, 44 to become so extensive as to virtually close the gap between the two adjacent columns.

To reduce this spreading (at 42, 44 in FIG. 3b) at the top of the columns, as well as to increase at least somewhat the spacing (see 46 in FIG. 3b) between adjacent columns, the composite substrate and partially deposited cesium iodide screen are fired in vacuum at about 450°–500° C for a period of about 20 minutes (at the higher mentioned temperature) to about one hour (if the lower part of this temperature range is utilized). Such heat treatment may be effected in the same hot wall vacuum evaporator (see FIG. 4) by merely raising the general temperature within the enclosure to the desired temperature range while running the vacuum pump to maintain a substantially complete vacuum. The cesium iodide at 32 and/or its container 30 would, of course, either be removed or previously completely used up. The effect of this firing is to cause the cesium iodide in the column to become compacted by forming of more perfect grains, so that both the height and, more importantly, the width of the column becomes slightly less after such treatment. Additionally, even at the temperature range of 450°–500° C, some of the previously deposited cesium iodide sublimes, such sublimation, of course, occurring primarily (as to its net effect) from the upper surface of the columns and especially from the corners (see 42, 44 in FIG. 3b). Thus, the screen after such heat treatment will be generally in the form shown in FIG. 3c, wherein the columns 40' no longer have the extended corners at their top (compare 42, 44 in FIG. 3b) but rather have a top surface 48 which has the opposite tendency to be rounded. Specifically, surface 48 is substantially at the same height in its center as was the column 40 in FIG. 3b (except for the slight shrinkage caused by compaction as previously noted) but the edge portions such as at 52, 54 are both substantially lower and somewhat rounded relative to the corresponding corners (42, 44) prior to the heat treatment. Additionally, the space between the columns at 46' is at least somewhat greater, again because of the compaction of the columns during the heat treatment; additionally, the tendency of the columns to come together at the top is substantially eliminated, both through this compaction and the fact that much of the material near the corners of the upper end of the columns have been removed by the previously noted tendency to sublime. Although the columns are still almost the same full 125 microns (5 mils) in height that they were prior to the firing step of FIGS. 2c and 3c, in the particular exemplary embodiment it is desired to make columns approximately 250 microns (10 mils) tall. To effect this end, the steps illustrated in FIGS. 2b and 3b are repeated, but utilizing the already columned structure shown in FIG. 3c as the "substrate" on which the additional cesium iodide is deposited. Thus, the partially manufactured screen of FIG. 3c (which as previously stated may have been fired in the same hot wall vacuum evaporator as shown in FIG. 4) is now utilized to deposit additional cesium iodide thereon in exactly the same manner as previously described relative to FIGS. 2b and 3b. Specifically, the temperature of the partially completed device of FIG. 3c is maintained at about 50°–150° C while a relatively high rate deposition (50 micron thickness per minute) of cesium iodide is deposited thereon until the total height of the columns is approximately 250 microns (i.e., an additional 125 microns thickness deposit is added). The resulting product is shown in FIG. 3d wherein the original column is indicated at 40' and its original top is indicated by dotted lines at 48, since this line not only represents the demarkation between the previously deposited cesium iodide and the newly deposited cesium iodide, but also has a physical significance in that the cesium iodide below this line has already been somewhat compacted by the firing step of FIGS. 2c and 3c, while the material above the line at 60 has not yet been so compacted. As in the analogous case shown in FIG. 2b, the newly added material will tend to form a column which gradually widens as the height is increased, with an especial tendency to widen very near the top by forming corners such as at 62, 64. To both widen the gap 66 between the newly formed columned parts 60 and to eliminate at least in part the material near the "points" of the "corners" 62, 64, the partially manufactured screen of FIG. 3d is treated in the same manner as previously described.

Thus, the full thickness partially manufactured screen of FIG. 3d is fired at 450°–500° C for from 1 hour to 20 minutes, so as to enlarge the space 66 and to eliminate the corners 62, 64 (see FIG. 3d) so as to result in the structure shown in FIG. 3e. Specifically, the upper portion 60' of each of the columns is now somewhat narrower than it was prior to this firing step and the previously existing "corners" (see 62, 64 in FIG. 3b) have sublimed away leaving a relatively rounded upper surface 68 on the column. It should be noted that the demarkation line, originally designated 48, between the first deposited part 40' and the second deposited part 60' of each column is now designated 48' in FIG. 3e since the material on either side of this boundary is now identical and the boundary therefore is substantially imaginary in nature.

It should be noted that the curvature of both the intermediary top surface 48 (FIG. 3c) represented by dotted line 48' and the analogous curved top surface 68 in FIG. 3e is somewhat exaggerated, this surface being, in fact, somewhat closer to flat than shown; this has been done so as to better emphasize the difference between surfaces 48, 68, respectively, relative to the original surfaces having corners 52, 54 and 62, 64 in FIGS. 3b and 3d, respectively. On the other hand, the space or gap between the columns after heat treatment (at 46', 66', respectively) in FIGS. 3c and 3e are substantially greater at least near their upper part than the corresponding gaps 46, 66 (FIGS. 3b and 3d, respectively) although this may not be obvious from the drawing. In particular, the heat treatment at 450° to 500° C causes about a 10% volume shrinkage by annealing out vacancies which are formed during the lower temperature deposition in the preceding manufacturing step. This shrinkage effect alone would cause widening of the upper part of the gaps, which have all but disappeared at the top as many be seen in FIGS. 3b and 3d, to be increased to about 10 to 15 microns. The sublimation of some of the material from the entire surface of each of the columns, but particularly from the area which once formed corners 42, 44 in FIG. 3b and 62, 64 in FIG. 3d causes further widening of the tops of these grooves or gaps so that the grooves are at least quite close to the original width (namely 25 microns) of the depressions in the substrate 18. Obviously, the relatively low temperture deposition steps (FIGS. 2b and 3b and the firing or heat treatment steps (FIGS. 2c and 3c and FIGS. 2e and 3e) may be repeated in sequence as many times as required to grow the particular thickness of cesium iodide desired while maintaining the cesium iodide in separate columns. In the particular specific embodiment illustrated and described, it was desired to form a 250 micron (10 mil) thick phosphor layer or screen and it has been found that only two deposition and heat treatment cycles are required to accomplish this. Obviously, the amount of material (i.e., the height of the column formed) in any single deposition step is limited by the fact that the tops of the columns tend to close the gap after a certain amount of cesium iodide has been deposited (see FIGS. 3b and 3d). Obviously, less than 125 microns of thickness may be deposited in a step, but such smaller increments of the deposition will be somewhat wasteful of time and equipment, while an attempt to deposit substantially more than 125 micron layer will result in the columns actually growing together at the top.

Assuming that the desired height of the columns has been reached (as in the exemplary embodiment at FIG. 3e), the screen is now annealed at approximately 615° C, (which is near but slightly below the melting point of cesium iodide) in an argon atmosphere (at approximately atmospheric pressure), the latter tending to suppress sublimation of the cesium iodide. This final firing step anneals out most of the light scattering bubbles which have resulted from coalescence of vacancies in the previous steps. Although the columns shrink in volume only an extremely small amount, nevertheless, the material of the columns is transformed from substantially translucent to substantially transparent by elimination of such relatively small bubbles. Thus, the main difference between the structure of FIG. 3f which illustrates the structure after it has been exposed to the high temperature firing step of FIG. 2f and of FIG. 3e before such firing is primarily in a slight flattening of the upper surface 78 of the upper part 70 of the column plus the fact that the columns are now transparent. Since this high temperature final firing step requires on the order of two or three hours of the treatment at 615° C, this final firing is preferably done in a separate furnace or oven rather than occupying this much time in the hot wall vacuum evaporator. However, as at least implied earlier, all of the other steps may conveniently be accomplished in the same hot wall vacuum evaporator without the need to remove the screen between steps. During the final firing step at FIG. 2f, 3f, the activator (such as thallium) may be added. Alternatively, such non-toxic and more compatible dopants, such as sodium, may at any (usually earlier) stage be incorporated into the cesium iodide.

After the final firing step, the spaces between the columns are preferably filled with a suitable material to insure that the light which is formed within each column when the phosphor screen is in use cannot escape from one column and reach another column (thereby causing the type of lateral spread of the light, the prevention of which is the main purpose of the invention). As shown in FIGS. 2g and 3g, such material is caused to fill the spaces between each of the columns as indicated at 76. The material utilized may be merely a highly reflective substance such as finely ground titanium dioxide, which may be either incorporated in, for example, a silicone resin or preferably deposited as a slurry in, say, methyl chloroform so as to be substantially pure when the liquid evaporates. Alternatively, and probably preferably, the material at 76 may be chosen from a group of relatively highly reflecting materials that are themselves relatively efficient phosphors for converting x-rays into light photons. Such materials include $Gd_2O_2S$ and $La_2O_2S$; and such a reflective phosphor may be carried in a silicone resin vehicle or merely be deposited in the gaps as a slurry with a volatile liquid (which is then subsequently evaporated). Regardless of whether the material at 76 is merely reflecting or (preferably) reflecting and a phosphor itself, this material insures that the light generated within each of the various columns 70 cannot spread into an adjacent column, thereby substantially increasing the resolution of the phosphor screen. Thus, both the fact that the gaps exist between the various columns (so that light generated within each column is at least partially trapped because of internal reflections at the lateral surfaces of the columns) and more particularly, the reflective quality of the material at 76 which insures such light cannot escape from one column (as would be the case for rays traveling near the normal to the surface) so as to preclude lateral spreading of such light from one column to another. Because of this it is possible to make the phosphor screen about twice as thick, (i.e., the height of the columns in the various figures) namely about 250 microns or 10 mils as conventional (unstructured) phosphor layer screens, with equal or superior spatial resolution, so as to yield about 50% more intensity (i.e., x-ray absorption and photon emission).

The final step in the manufacture of the phosphor screen itself is merely the addition of a transparent top coating as shown at 80 at FIG. 3h so as to form a flat, smooth surface on which the photoemitter layer may be placed (see FIG. 1 at 12). Transparent coating 80 may be a silicone resin applied in any conventional manner. It should be noted that none of the FIGS. 3a–3h are strictly to scale, although the relative dimensions of the cesium iodide columns and the spaces or gaps therebetween are at least approximately proportional to the actual dimensions, as may be seen from the various numerical data variously given in the description above. Similarly, the relative dimensions in FIG. 1 are not to scale, especially as to the phosphor layer and the photoemitting coating 11, 12, respectively, relative to the thickness of the face plate 10a of the image intensifying tube shown therein.

Figure 5:
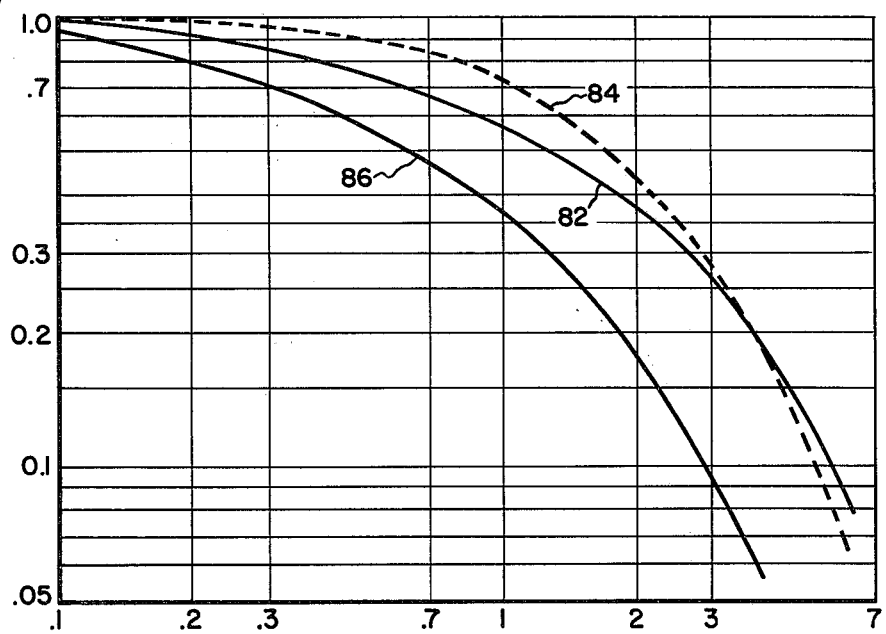

The relative advantages of utilizing a phosphor screen comprising the spaced small columns of phosphor material according to the invention may be readily seen from FIG. 5. which is a modulation transfer function graph of two different thickness conventional (i.e., solid layer) cesium iodide screens and of a single column-type structured cesium iodide screen according to the invention. The data for all three curves was obtained under exactly the same conditions from phosphor screens utilized with the same photoemitting layer (both as to material and thickness) and in the same x-ray image intensifying tube and other x-ray apparatus. The upper one of the two solid curves at 82 represents the modulation transfer data for a conventional 125 micron thick solid cesium iodide screen layer (this being the most commonly utilized layer in existing commercial apparatus). The uppermost dashed line curve 84 represents the modulation transfer data for a 250 micron thick cesium iodide phosphor screen made according to the invention. As may be readily seen from comparison of curves 82 and 84, the thicker structured phosphor screen according to the invention exhibits higher contrast for line pair spacings of up to 3½ per millimeter (approximately 90 line pairs per inch). Besides this improvement in contrast for all spatial frequencies that are practically utilized, which may also be thought of as an improvement in apparent resolution, the thicker cesium iodide phosphor screen according to the invention obviously has higher brightness for a given intensity of incident x-rays. Thus, the "quantum absorption" of a 250 micron (10 mil) structured phosphor screen according to the invention is 0.55, while the conventional 125 micron (5 mil) solid phosphor layer screen yields a quantum absorption of only 0.30. Thus, a practical screen according to the invention has about a 50% improvement so that only ⅔ the radiation "dose" is required to obtain the same signal-to-noise ratio as well as a substantial improvement in practical resolution over the normal range of interest. The lower solid line curve 86 represents a 250 micron (10 mil) solid layer cesium iodide phosphor screen, which is included merely for comparison purposes (i.e., does not represent any screen that is normally utilized in commercial instruments). Although such a thick solid phosphor layer screen will, of course, exhibit high "quantum absorption" of over 0.5, it can readily be seen from curve 86 that its apparent resolution and contrast are much below both of the other curves. Thus, for example, at a contrast ratio of 0.3 the structured 250 micron phosphor layer according to the invention exhibits a resolution of 2.8 line pairs per millimeter, a conventional 125 micron thick solid phosphor layer exhibits a separating ability for 2.6 line pairs per millimeter, while the 250 micron thick solid phosphor layer can only resolve 1.3 line pairs per millimeter (i.e., about 71, 66 and 33 line pairs per inch, respectively). Taken from a different point of view, if one is interested in obtaining resolution of at least 2 line pairs per millimeter (i.e., just over 50 lines per inch), the structured phosphor screen according to the invention exhibits a contrast ratio of 0.45, the conventional 125 micron solid phosphor screen exhibits a contrast of 0.38, while a 250 micron thick phosphor screen would exhibit a contrast of only 0.18. Thus, when the structured phosphor layered screen according to the invention is compared to the similar thickness and brightness 250 micron solid cesium iodide layer of curve 86, a very large difference in the resolution-contrast capabilities is readily apparent. When the phosphor screen according to the invention (curve 84) is compared to the conventional solid phosphor screen layer of 125 microns, thickness, it exhibits a substantial improvement in absorption as well as an appreciable improvement in its modulation transfer characteristics (i.e., its relative resolution and contrast) over the entire practical range of interest (i.e., up to approximately 3.5 line pairs per millimeter or approximately 90 line pairs per inch).

Thus, a phosphor screen according to the invention exhibits not only an improved quantum absorption or efficiency leading to an image of higher signal-to-noise ratio, but also practically improved resolution and contrast relative to a conventional solid phosphor screen (of half the thickness). In other words, the inhibition of lateral spreading of the light photons generated within the individual columns of the inventive phosphor screen is so substantial that the resolution is practically superior to a phosphor screen of conventional design of only one half the thickness. When the phosphor screen of the invention is compared to a solid phosphor screen of the same thickness, the difference in resolution and contrast is extremely marked as may be seen for comparison of curves 84 and 86 in FIG. 5. Thus, the screen according to the invention exhibits both higher signal-to-noise and practically greater resolution and contrast than existing conventional screens and exhibits an extremely noticable difference in resolution and contrast relative to a screen made in the conventional manner of twice the normal commercial thickness (so as to obtain substantially the same absorption as the new structured screen). Obviously, for special purposes, the phosphor screen may be made according to the invention at a compromise thickness (for example more than 125 but less than 250 microns) so as to obtain a different "mix" of improved absorption and improved resolution-contrast. Thus, if the screen is made in accordance with the invention so that the columns are only 125 microns "tall" and preferably with similarly scaled down lateral dimensions (as to both width and spacing) as may be readily accomplished by scaling down the "checkerboard" pattern on the substrate, obviously the resulting screen will have greatly improved resolution and contrast relative to a conventional solid screen of 125 micron thickness (but will not, in general, show any improvement in absorption thereover). Conversely, the screen may be made according to the invention of even greater thickness than 250 microns so as to increase the brightness still further without necessarily reducing the practical resolution and contrast (i.e., up to say 2 line pairs per millimeter) below that of a conventional solid 125 micron phosphor screen. Thus, the exemplary embodiment is of what is considered a reasonable approximation of the best compromise of 250 micron thickness so as to obtain both substantial improvement in absorption and at least moderate improvement in image quality, but such embodiment is, of course, merely exemplary since increase in either absorption or image quality may be considered more important in a particular application so that the screen may be made thicker or thinner, respectively, than the exemplary 250 microns.

Although the invention has been described as utilized in its preferred environment, mainly as the phosphor screen for an x-ray image intensifying tube of the general type shown in FIG. 1, nevertheless the phosphor screen according to the invention may also be utilized in radiographic intensifying screens, specifically of the type in which a phosphor screen is positioned between a source of x-rays and a film (with the subject or object being x-rayed being, of course, positioned generally between the x-ray source and the phosphor-film combination). Since the invention may be utilized for any such analogous purpose, the invention is not limited to a phosphor screen useful solely in an x-ray intensifying tube. Further, although specific materials, conditions (such as temperature or the like), and suggested manufacturing apparatus have been described and illustrated in the disclosure, it is clear that all of these may be varied to some extent particularly in view of the fact that these variables are somewhat interdependent. Thus, the exemplary structural embodiment and particular method of manufacture are both merely exemplary rather than definitive of the bounds of the invention. Rather, the specific novelty and scope of the invention is defined in the appended claims.

What is claimed is:

1. A method for making an improved phosphor screen of the type which absorbs one type of radiation and re-emits a different type of radiation, comprising the steps of:
    patterning a generally planar substrate so as to form a large plurality of relatively raised portions, each separated by a relatively recessed portion, throughout a substantial area of said substrate;
    vapor depositing a phosphor material on said patterned substrate at substantial angles relative to the normal to said substrate so that only said raised portions are covered by a substantial thickness of said phosphor material and said recessed portions receive substantially none, thereby yielding a phosphor layer comprising columns of phosphor material substantially separated from each other; and
    heat annealing said column-type phosphor screen so as to cause the phosphor material thereof to become substantially transparent by substantially eliminating any small bubbles which could otherwise cause radiation scattering within the material, whereby a phosphor screen including a series of spaced substantially transparent columns of the phosphor material is formed.

2. A method according to claim 1, in which:
said phosphor material comprises cesium iodide.

3. A method according to claim 1, in which:
said phosphor material comprises cesium iodide doped with a metal selected from the group consisting of thallium and sodium.

4. A method according to claim 1, in which:
said phosphor material is deposited by a hot-wall evaporator, so that most of the phosphor material reaching said substrate bounces off the side walls of the evaporator and is incident on said substrate at a large angle relative to its normal.

5. A method according to claim 1, in which:
after vapor depositing of said phosphor material but before heat annealing, said column-type phosphor layer is heat treated to increase the spaces between said phosphor columns.

6. A method according to claim 5, in which:
said heat treating step comprises heating said composite substrate and phosphor material to a temperature of between approximately 450°–500° C for about 20 to 60 minutes.

7. A method according to claim 5, in which:
both said vapor depositing and said intermediate treating steps are repeated at least once before said heat annealing step is effected.

8. A method according to claim 1, in which:
said heat annealing step comprises heating said phosphor material for a substantial period of time to a temperature near its melting point under conditions which limit its tendency to sublime.

9. A method according to claim 8, in which:
said phosphor material is cesium iodide and said heat annealing step comprises heating to about 615° C for about 2–3 hours under about one atmosphere of an inert gas.

10. A method according to claim 1, in which:
after said heat annealing step, the spaces between said phosphor material columns are filled with a substance which is highly reflective of the radiation emitted by said phosphor material, so that radiation escaping from a side wall of a column from which it originates is reflected back into that column.

11. A method according to claim 10, in which:
said reflective substance comprises titanium dioxide ($TiO_2$).

12. A method according to claim 10, in which:
said reflective substance comprises a second phosphor material which also exhibits reflecting properties.

13. A method according to claim 12, in which:
said reflective phosphor substance is chosen from the group consisting of gadolinium oxysulfide ($Gd_2O_2S$) and lanthanum oxysulfide ($La_2O_2S$).

14. A method according to claim 10, in which:
after said space-filling step, a transparent material is coated on top of said columns and reflective substance, so as to form a flat, relatively smooth upper surface.

15. A method according to claim 1, in which:
said raised portions of said substrate are about a few mils square in dimension and said recessed portions and their relative depth are on the order of a mil.

* * * * *